United States Patent [19]

Richmond

[11] 4,322,916
[45] Apr. 6, 1982

[54] APPARATUS FOR MAKING MULTIPLE RIB BELTS

[75] Inventor: Kenneth D. Richmond, Nixa, Mo.

[73] Assignee: Dayco Corporation, Dayton, Ohio

[21] Appl. No.: 56,756

[22] Filed: Jul. 12, 1979

Related U.S. Application Data

[62] Division of Ser. No. 886,206, Mar. 13, 1978, abandoned.

[51] Int. Cl.³ .............................................. B24B 7/02
[52] U.S. Cl. .................................... 51/78; 51/281 R; 51/326; 51/327; 156/137; 156/140; 156/142; 156/250; 156/510
[58] Field of Search ............... 156/137, 138, 139, 140, 156/141, 142, 250, 510; 74/231 R, 232, 233, 234; 51/327, 78, 281 R, 326

[56] References Cited

U.S. PATENT DOCUMENTS

| | | | |
|---|---|---|---|
| 3,799,824 | 3/1974 | Arnao et al. | 156/140 |
| 3,839,116 | 10/1974 | Thomas et al. | 156/140 |
| 3,919,025 | 11/1975 | Ray | 156/250 |

Primary Examiner—Caleb Weston
Attorney, Agent, or Firm—Charles E. Bricker

[57] ABSTRACT

An apparatus and method is provided for making endless multiple rib power transmission belts each comprising one or more pulley engaging sections by separating these belts from belt bodies having a greater number of pulley engaging sections. The apparatus comprises support means, a belt holding and rotating assembly mounted on the support means and a cutting assembly mounted on the support means.

10 Claims, 4 Drawing Figures

U.S. Patent      Apr. 6, 1982      4,322,916
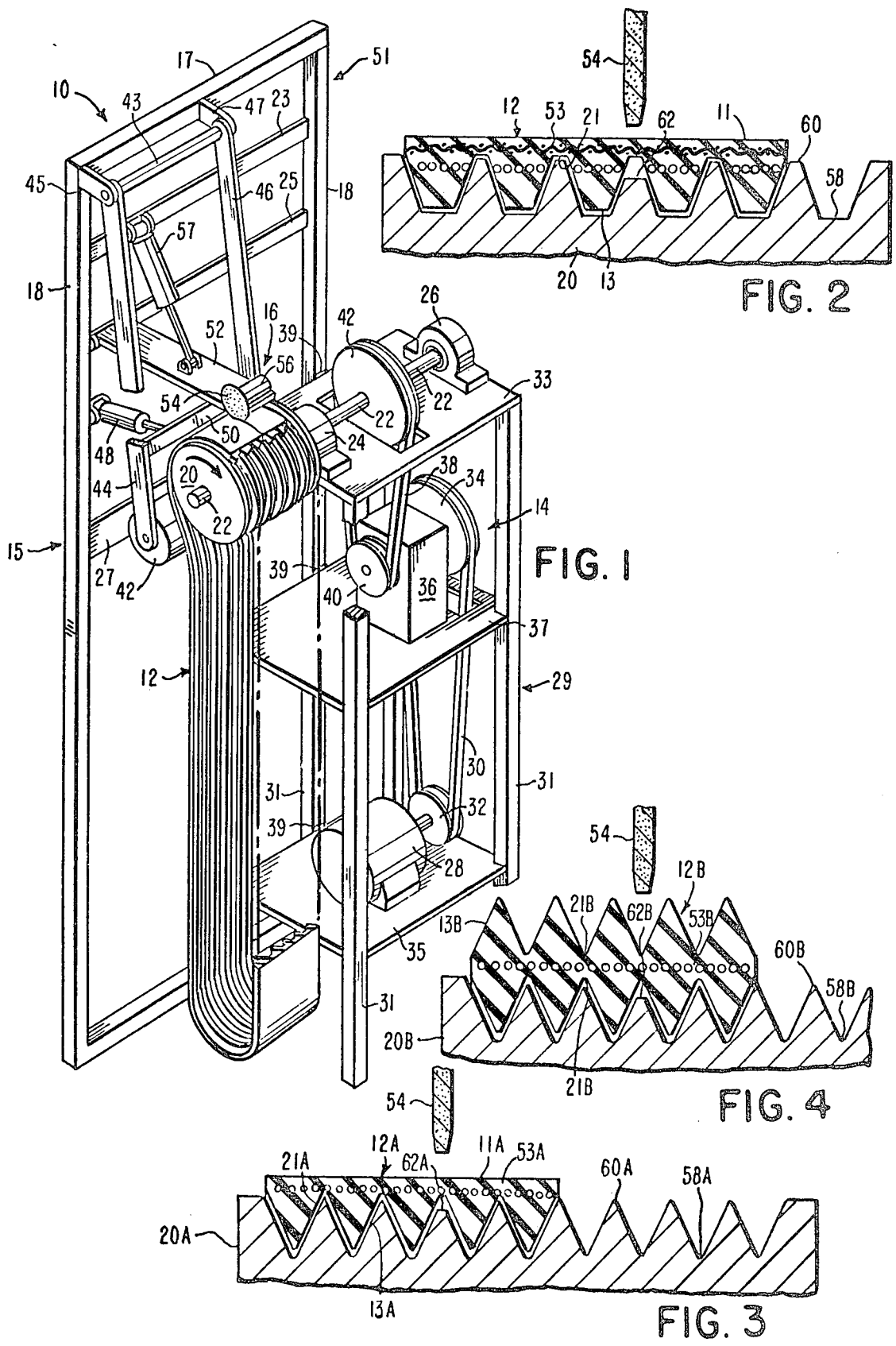

APPARATUS FOR MAKING MULTIPLE RIB BELTS

This is a division, of application Ser. No. 886,206, filed Mar. 13, 1978 now abandoned.

BACKGROUND OF THE INVENTION

This invention relates to a belt separating apparatus. In particular, this invention relates to an apparatus and method for separating a multiple rib endless power transmission belt body comprising at least two pulley engaging sections into smaller multiples of one or more pulley engaging sections.

Multiple V-belts are widely used in applications requiring transfer of large power loads. When more than one individual belt is used on the same pulley, it is apparent that unless all of the belts are relatively uniform in length, density, flexibility and other basic physical properties, the load will be distributed unevenly. Such uneven load distribution will result in a transfer of the load to less than all of the belts causing certain of them to be overloaded and to fail prematurely. Whipping and twisting of the individual belts on a multiple belt drive may also result from uneven load distribution.

To remedy these problems arising from the use of individual belts in multiple belt drives, various types of multiple rib belts have been devised so that more than one rib on the belt will mesh with corresponding multiple grooves in the pulley. These belts can be built up in the conventional manner as for single belts and then fixed in lateral relationship. Basically, the multiple rib belts may be constructed in two different ways. The first method provides belts commonly referred to as banded belts, which are manufactured by forming individual conventional belts each having a generally trapezoidal cross-section, banded together at the outermost portion of the tension sections by a common tie band. These banded belts are normally made by assembling two to five such belt bodies. The other method provides belts known as V-ribbed belts, which differ from banded belts in that they have a common tension section and neutral axis section, but only the compression section is cut in the form of individual ribs which mate with grooves in the sheaves. These ribs may be of full V-shape, or truncated.

Because of the wide variety of lengths and cross-sections employed in industry and agriculture, it is impractical to warehouse all the multiple rib belts that a manufacturer might offer for sale. The lesser used belts are often not available at a local warehouse and must be ordered from factory stock.

It has been proposed to stock the less frequently used sizes of belts in multiples of five ribs, and to separate the belt into the desired multiples as needed. It has, until now, been impractical to do this because of the cost of the cutting and trimming machinery. Moreover, it is not desirable to separate the band of the banded belts or the tension section of the V-ribbed belts by cutting by hand, because such cutting leaves a raagged edge which may cause separation when the belt is in operation.

It is, therefore, an object of the present invention to provide an apparatus and method for separating a multiple rib belt of a given number of ribs into belts having less ribs.

Other objects, aspects and advantages of the present invention will be apparent to those skilled in the art from the following description of the invention, the attached drawing and the appended claims.

SUMMARY OF THE INVENTION

In accordance with the invention there is provided an apparatus and method for separating an endless power transmission belt body made primarily of elastomeric materials, comprising at least two pulley engaging ribs, into smaller multiples of one or more pulley engaging ribs. The apparatus of this invention is useful for either banded belts or V-ribbed belts.

Multiple rib V-belts of the banded type are disclosed in the following U.S. Pat. Nos. 3,523,461 issued Aug. 11, 1970 to Nemecek and Henderson; 3,564,933, issued Feb. 23, 1971 to Clinkenbeard; 3,853,017, issued Dec. 10, 1974 to White, Jr. and Miranti, Jr.; 3,996,813, issued Dec. 14, 1976 to Henderson and White, Jr.; and 4,011,766, issued Mar. 15, 1977 to Waugh.

V-ribbed belts are disclosed in the following U.S. Pat. Nos. 3,839,116, issued Oct. 1, 1974; 3,981,206, issued Sept. 21, 1976; 4,027,545, issued June 7, 1977; and 4,047,446, issued Sept. 13, 1977. A modified form of these belts known as a double V-ribbed belt, is illustrated in U.S. Pat. No. 2,728,239, issued Dec. 27, 1955.

Unless otherwise specified, the banded V-belts, the V-ribbed belts, and the double V-ribbed belts are hereinafter referred to as multiple rib belts.

The apparatus of this invention comprises a support means, a belt holding and rotating assembly mounted on the support means, and a cutting assembly mounted on the support means. To perform the cutting operation, the belt body is placed over a supporting sheave so that all of the ribbed portions of the body mesh within the grooves, and a roller is applied against the outer surface of the body to apply pressure against the sheave. The sheave is rotated so that the belt body is also rotated, and the cutter is lowered to cut through the body at pre-selected points. This novel process and apparatus differ from that set forth in U.S. Pat. Nos. 3,711,996 and 3,818,576, issued to Braden, in which a belt sleeve is cut from the ribbed side to form single belts. The concept of grinding or cutting from the ribbed side is also illustrated in U.S. Pat. Nos. 3,822,516 and 3,891,405, issued to Huber.

DESCRIPTION OF THE DRAWING

FIG. 1 is a perspective view illustrating the novel apparatus.

FIG. 2 illustrates a banded V-belt in position for cutting.

FIG. 3 illustrates a V-ribbed belt in position for cutting.

FIG. 4 illustrates a double V-ribbed belt in position for cutting.

DESCRIPTION OF THE PREFERRED EMBODIMENT

Referring now to the drawing, FIG. 1 illustrates an apparatus, designated generally at 10, for separating a banded belt body 12 having opposed surfaces, also shown in FIG. 2. One of the surfaces is a ribbed inner surface with a plurality of longitudinally extending continuous ribs 13 separated by alternating grooves 21. The ribs are interconnected by a continuous segment or band designated by reference numeral 53, and constructed by any of the various arrangements of the banded belts referred to in the above patents. The outer surface 11 is flat. The apparatus is designed to cut through the outer surface and then sever the segment 53 to form finished multiple rib power transmission belts, each having a lesser number of ribs. The apparatus 10 comprises a belt holding and rotating assembly 14 and a cutting assembly 16 disposed on a frame generally designated by reference number 51. This frame is formed of two separate segments, the first of which is generally rectangular and disposed in a vertical plane. This segment 15 consists of an upper horizontal member 17, a lower horizontal member 19, and vertical member 18. Three intermediate horizontal bars 23, 25, and 27 extend parallel to the upper and lower members and are interconnected to the vertical members. The other segment 29 is formed of four vertical legs 31 (one of which is omitted for clarity) upon which are mounted a top shelf 33, a bottom shelf 35 and an intermediate shelf 37. The frame segment 29 is interconnected to the frame segment 15 by conventional fastening means, such as welding or bolting, at points designated by reference numeral 39.

The belt holding and rotating assembly 14 comprises a cylindrical support 20, in the form of a multiple groove sheave, mounted for rotation on a shaft 22. The shaft is supported by bearings 24 and 26 which are mounted upon the shelf 33. A motor 28 is mounted on the shelf 35 and has a shaft 41 which drives a pulley 32. Mounted on shelf 37 is a speed reducer 36 to which is coupled a pulley 34. A drive belt 30 transmits power to the speed reducer by means of the pulleys 32 and 34. Also coupled to the speed reducer is a pulley 40, by which power is transmitted to a pulley 42 mounted on shaft 22, by means of drive belt 38, and thus to the shaft 22 and sheave 20.

The belt holding and rotating assembly 14 also includes a roller 42 for contacting the outer surface 11 of the body 12, thus forcing the ribbed surface into contact with the sheave 20 to assure positive alignment of the ribs 13 of the belt with the grooves 21 of the sheave. The roller 42 is mounted for rotation on arms 44 and 46 which are pivotally mounted at their opposite ends to an arm 43, which in turn is mounted on supports 45 and 47, secured to upper member 17. An actuating means 48, such as a hydraulic cylinder, is mounted at one end to the vertical member 18 and at its other end to crossbar 50 which connects the arms 44 and 46, for moving the roller 42 into contact with the belt 12. This cylinder may be actuated by a conventional pneumatic or hydraulic system (not shown).

The cutting assembly 16 comprises a mounting plate 52 which is pivotally mounted at one end to bar 25. At the other end of the plate 52 is mounted a high speed motor 56, preferably of the pneumatic type. The motor has a cutting wheel 54 which is usually an abrasive wheel, for cutting the belt body. The motor and cutting wheel are moved into contact with the belt 12 by means of another cylinder 57, similar to cylinder 48, which is pivotally mounted at one end to the bar 23 and at the other end to plate 52.

Referring further to FIG. 2, the cylindrical support 20 is preferably a multiple groove sheave having a plurality of grooves 58 and ribs 60. One such rib is partially removed, as at 62, to provide clearance for the cutting wheel 54 so that the wheel will not strike the sheave while cutting. The grooves 58 in the sheave 20 shown in FIG. 2 have a cross-sectional truncated V-shape.

FIG. 3 illustrates a similar sheave 20A, which has somewhat different V-shaped grooves 58A and ribs 60A for cutting a V-ribbed belt body 12A. Belt body 12A has a ribbed inner surface with longitudinally extending ribs 13A and grooves 21A; and an outer flat surface 11A. The ribs 13A are interconnected by segment 53A. The sheave 20 is interchangeable and is selected to conform to the cross section of the belt being cut. One rib at 62A is removed to provide clearance in the same manner as rib 62.

A modified form of V-ribbed belt body, shown in FIG. 4, is designated by reference numeral 12B, and has a double-V configuration. Both surfaces are ribbed, having alternating longitudinal ribs 13B and grooves 21B interconnected by segment 53B. The supporting member, designated as sheave 20B is identical to 20A, with grooves 58B and ribs 60B identical to 58A and 58B. A portion of one rib is removed at 62B to provide clearance as at 62 and 62A.

OPERATION OF THE APPARATUS

In operation, a sheave 20 having the desired groove cross-section is placed on the shaft 22 and the cutting assembly 16 is lowered by the motor 58 just far enough to align the partially removed rib 62 of the sheave 20 with the cutting wheel 54. This, of course, is done without actuating the cutter. When so aligned, the sheave is secured in place, by fastening means not shown, and the cutting assembly is raised. The belt body 12 is placed over the sheave 20 so that the desired line of separation is over the partially removed rib 62; the remainder of the belt is allowed to hang free. If necessary, the roller 42 is moved into position by means of cylinder 48 to hold the belt body 12 in alignment on the sheave 20. The motor 28 is started, thereby rotating the sheave 20 in the direction shown by the arrow in FIG. 1, and simultaneously rotating the belt body 12. The motor 56 is started, thereby rotating the cutting wheel 54 and the cutting assembly is then lowered by means of cylinder 57 to contact the outer surface 11 of the belt body.

The sheave 20 is rotated at a speed which will allow the cutting wheel 54 to initially cut through the outer surface 11, then subsequently cut through the continuous segment 53 of the belt body; namely the segment radially opposite of the truncated rib 62. It is contemplated that the sheave 20 will be rotated at a speed in the approximate range of 0.1 to 10 rpm, preferably about 1 to 5 rpm.

The cutting wheel 54 is also rotated at a speed which will allow it to cut smoothly through the continuous segment 53. Generally, the speed of the grinding wheel is in the approximate range of 1000 to 10,000 rpm or higher, preferably about 2500 to 4,000 rpm. The cutting wheel 54 can be any cutting wheel known in the art for cutting into or through a rubber or rubber-like composition, such as a rotary knife, a saw blade, a grinding wheel or the like. A grinding wheel is shown in FIG. 2 and is presently preferred.

The number of grooves in the sheave 20 is a matter of choice. It is contemplated that the multiple rib belt bodies will be stored with five ribs; therefore, the logical choice for sheave 20 is one having 6 grooves, with the pre-selected truncated or partially removed rib between the second and third groove, thereby allowing a five rib belt body to be cut into component belts having one, two, three, or four ribs.

The apparatus of this invention can be adapted for automatic control, such that after the initial set-up, the apparatus can be left unattended and will shut itself off when the continuous segment is cut throughout its circumferential length.

The cutting operation for belt body 12A of FIG. 3 is identical. In this instance the same operation results in cutting first through outer surface 11A, then severing the segment 53A opposite the truncated rib of the sheave at 62A. Likewise the same operation holds true for belt body 12B of FIG. 4, except that in this instance the outer surface of the body is ribbed, as is the inner surface. Thus the initial cut occurs through a groove 21B opposite the truncated rib of the sheave at 62B, followed by severing the segment 53B in that area.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

What is claimed is:

1. An apparatus for separating a multiple rib endless power transmission belt made primarily of elastomeric material and having at least two pulley engaging ribs into smaller multiples of at least one pulley engaging rib, said apparatus comprising:
   (a) a support frame;
   (b) a belt holding and rotating assembly comprising, a multiple groove sheave rotatably mounted on said frame and being adapted to support said belt thereon so that a lower portion of said belt hangs free, said sheave having a plurality of alternating grooves and ribs therein with each of said grooves having a cross section which conforms to the cross section of each of said ribs of said belt being separated, means for rotating said sheave at a predetermined rotational speed, and a roller for contacting the outer surface of said belt and forcing said pulley engaging ribs into contact with an upstream portion of said sheave during rotation thereof to thereby assure positive alignment of said belt ribs with said sheave grooves; and,
   (c) a cutting assembly mounted on said frame, said cutting assembly comprising cutting means for engaging said belt and cutting same completely therethrough between two of said pulley engaging ribs.

2. The apparatus of claim 1 wherein said grooves of said sheave have a truncated V-shape when viewed in cross section.

3. The apparatus of claim 1 wherein said grooves of said sheave are V-shaped when viewed in cross section.

4. The apparatus of claim 1 and further comprising means for aligning said cutting means with one of said ribs of said sheave.

5. The apparatus of claim 1 wherein a portion of one of said ribs of said sheave is removed, said removed portion being adapted to provide clearance for said cutting means during cutting of said belt.

6. The apparatus of claim 1 wherein said belt holding and rotating assembly further comprises, a pair of arms rotatably supporting said roller at one of their ends, means pivotally mounting the opposite ends of said arms to a member carried by said support frame, and actuating means acting between said arms and said support frame for moving said roller into contact with said outer surface of said belt.

7. The apparatus of claim 6 wherein said actuating means comprises a fluid actuated cylinder.

8. The apparatus of claim 1 wherein said cutting means comprises a rotatable cutting wheel and motor means for rotating said wheel at a predetermined rotational cutting speed.

9. The apparatus of claim 8 wherein said cutting wheel is a grinding wheel.

10. The apparatus of claim 8 wherein said motor means provides rotation of said cutting wheel at a speed within the approximate speed range of 1,000 to 10,000 rpm and said means for rotating said sheave provides rotation thereof at a speed within the approximate speed range of 0.1 to 10 rpm.

* * * * *